3,270,115
METHOD AND APPARATUS FOR MOLDING

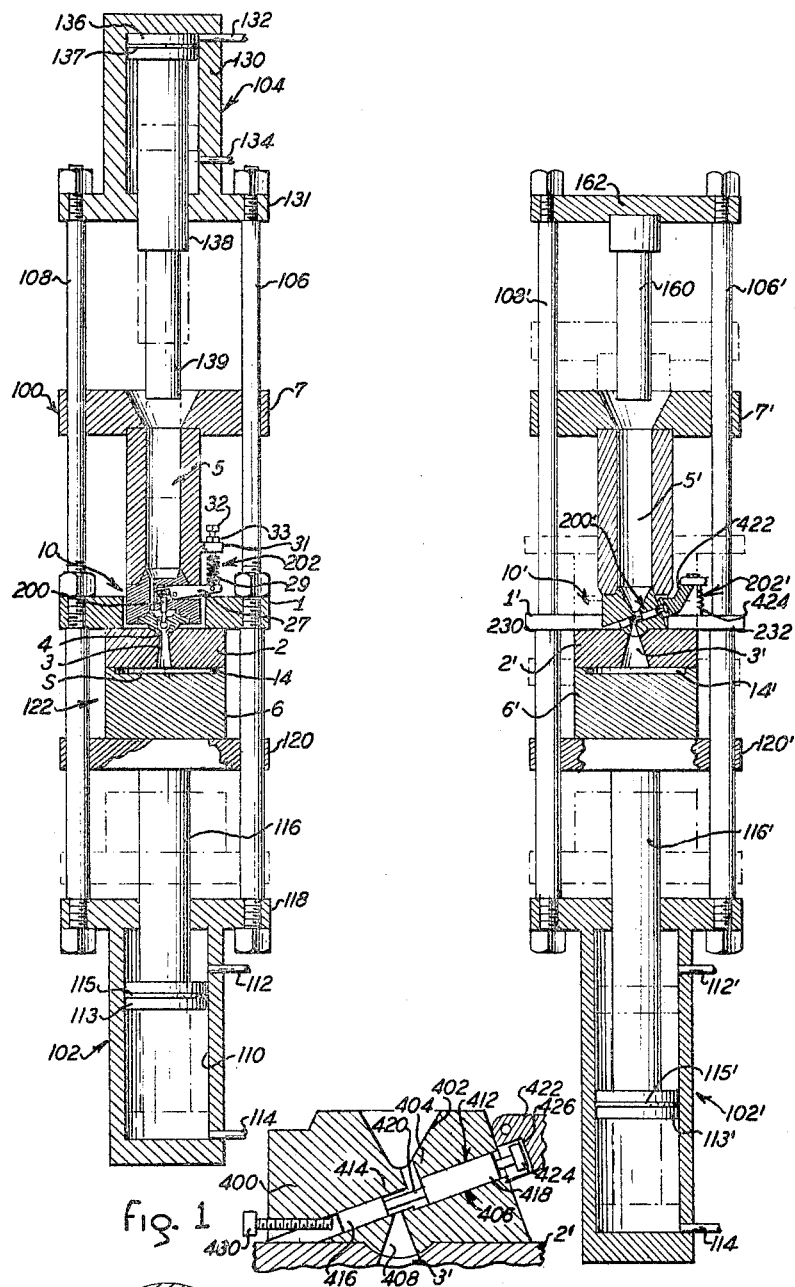

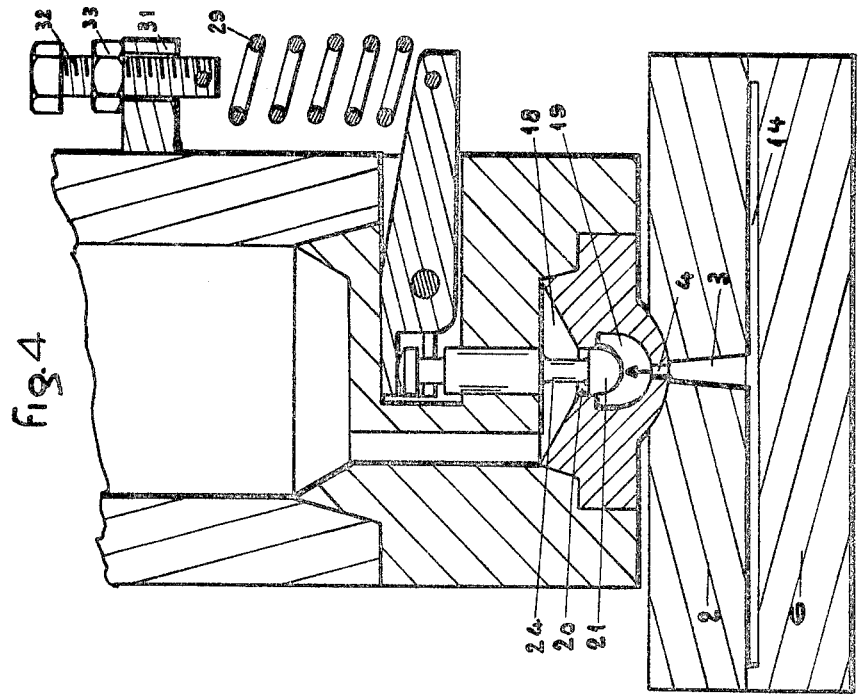
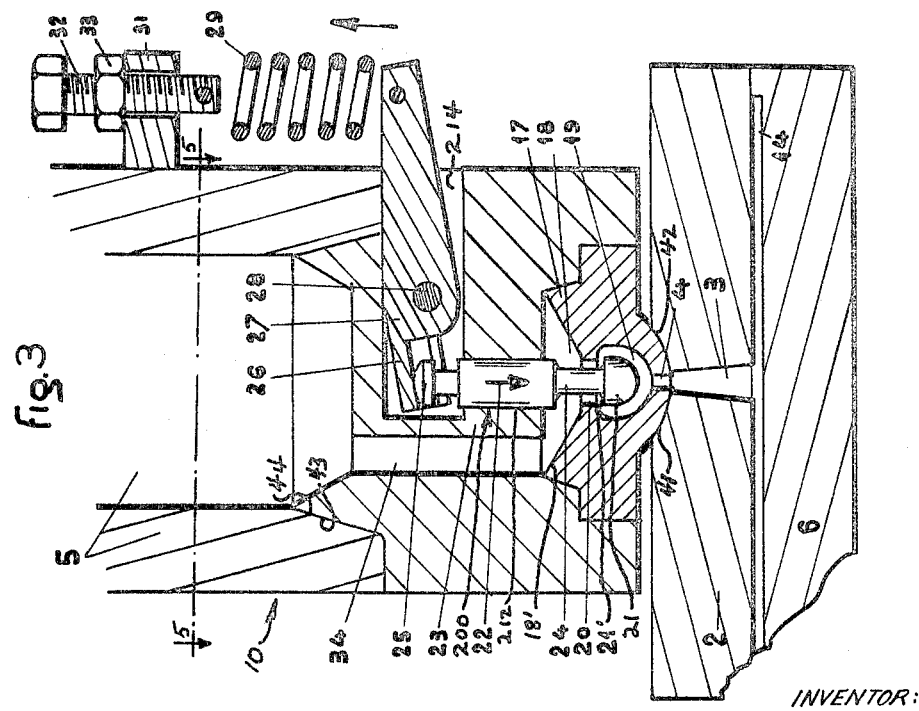

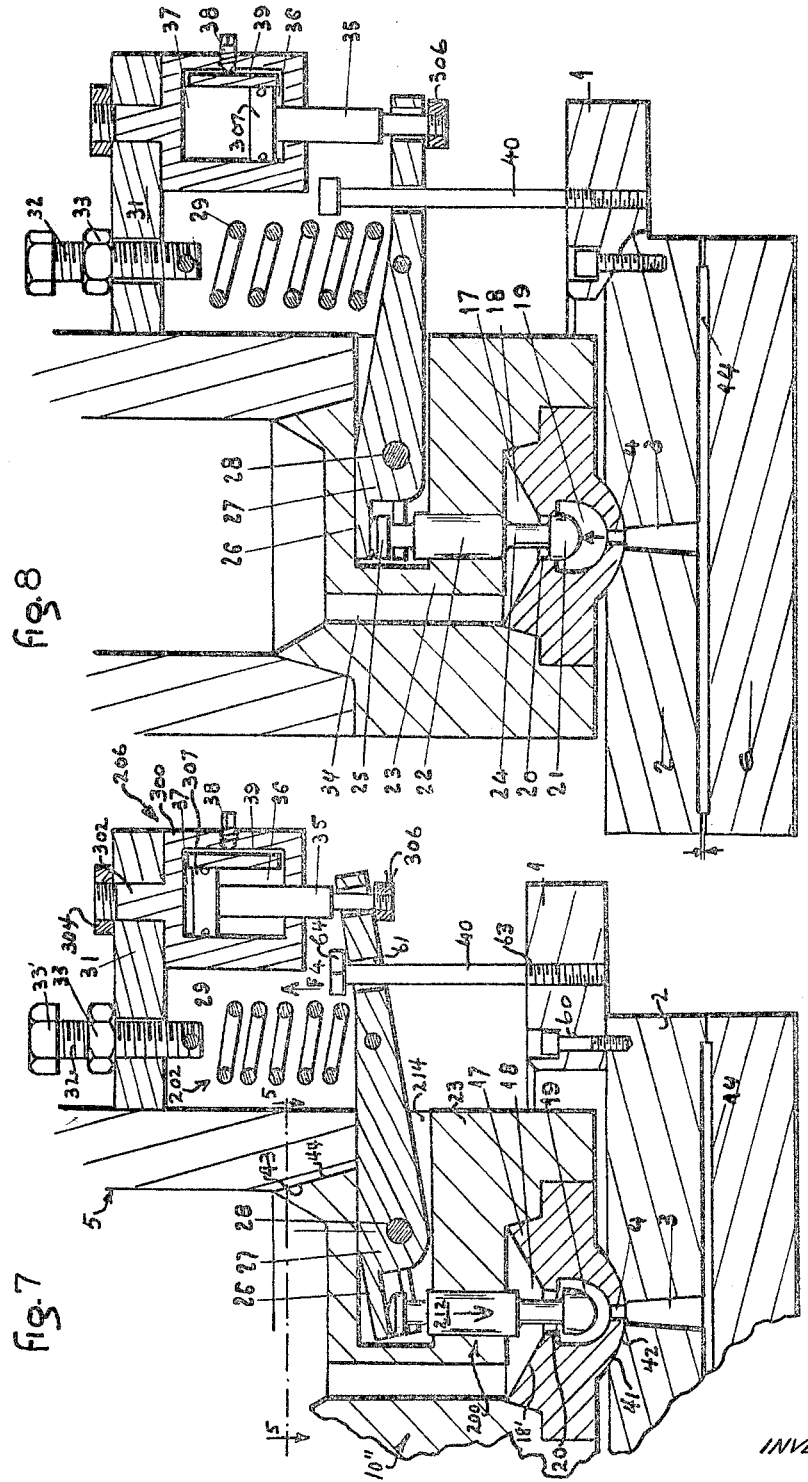

Robert Nouel, Villejuif, France, assignor, by mesne assignments, to Inventions Finance Corporation, New York, N.Y., a corporation of Delaware
Filed Feb. 14, 1961, Ser. No. 89,254
Claims priority, application France, Feb. 23, 1960, 819,321
7 Claims. (Cl. 264—328)

This invention relates to improved methods of, and improvements in apparatus for, molding articles, and is particularly concerned with improvements in methods of, and apparatus for, molding plastic articles having large frontal molded surfaces and/or articles which are required to meet precision standards.

While various methods of molding plastic articles have been heretofore suggested, and while many types of apparatus for molding plastic articles are available, two of the serious problems still faced by the plastics molding industry are (1) the molding of articles having large frontal molded surfaces, i.e., articles having, in some part or portion, a surface of large cross-sectional area and (2) the rapid molding of precise articles. The problems arise (a) because when utilizing the rapid injection molding techniques, the pressures used for forcing material to be molded into a molding cavity at a suitable rate, when acting on large frontal surfaces, present forces larger than the available forces used to urge the separable parts of the mold together, and the pressures within the mold vary above acceptable minimum values whereby internal tensions of the material prevent precise molding, and (b) because when using compression molding techniques heretofore available, the time of operation is prolonged so that it is impossible to obtain rapid and inexpensive production.

Although various types of valve control devices have been suggested for use in, or with the nozzle, such devices either do not provide the necessary control, or are responsive to mechanical displacement of machine elements and not direct material pressure.

In the so-called double action injection molding machines, the frontal surface of the molded article is limited by the injection pressure required because the force tending to push the mold section apart is proportional to the injection pressure multiplied by the frontal surface (Force=pressure×area), and this force can be no greater than the force pushing the mold sections together. Thus either the force pushing the sections together must be increased to mold large frontal surface components, or the injection pressure must be decreased. In the so-called single action injection molding machines, the problem is even more acute because the force tending to push the sections together is used to provide the injection pressure, and thus the frontal surface of the article (the surface against which the injection pressure acts) must be theoretically less than the surface area of the injection piston, and in practice, very little if at all larger than the surface area of the injection piston. Moreover, with injection molding machines, regardless of type, the injection pressure continues to be applied to material in the mold after the mold is filled, and this causes severe internal stress.

Molding by compression, i.e., fluidizing material in the mold, compressing the material, and then cooling the article molded, allows for productions of accurately-molded articles, but the molds are complex in that they must be provided with both heating and cooling means, and the time of molding is prohibitive for manufacture of many, and particularly inexpensive, articles.

The present invention has as its principal object the provision of a method of molding which incorporates the many advantages of the injection molding techniques, as well as the advantages of the compression molded techniques, but which is not subject to the primary disadvantages of such prior techniques as outlined above. A further primary object of the present invention is to provide an apparatus which automatically carries out the method steps, and which can be used on, and in combination with, available injection molding machines.

Still further and more specific objects of the present invention are: (a) to provide a method of molding, and a simple apparatus for performing such method of molding, which method and apparatus permit an inexpensive molding machine to make molded pieces having surfaces of greater size than that of the pieces that such machine was able to mold without such mechanisms; (b) to provide a method of molding, and an apparatus for performing such method of molding, which provide, without inconvenience, increased accuracy in aritcles molded in injection presses, thereby making possible rapid production of non-defective pieces; (c) to provide a method of molding, and an apparatus for performing such method which make it possible to mold in a simple injection press, a great number of pieces which heretofore could only be molded in the more expensive double injection type presses; (d) to provide a method, and apparatus for automatically performing such method, which provide accurately-molded pieces without requiring complicated heating and cooling means for the molding press, and (e) to provide a method of and apparatus for molding plastic articles which allow for combined injection and compression molding in a single machine of inexpensive type at a rapid rate.

According to the invention, the foregoing objects can be all successfully achieved by controlling the transfer of material in an injection molding press between the material feed means and the mold cavity so as to prevent the internal pressure in the mold cavity caused by material fed thereto from exceeding a predetermined value and so as to make pressures existent within the mold, when full, independent of or separate from pressures applied to material in the feed means. Thus, still further and yet more specific objects of the method phase of the invention are: (a) the provision of a method of molding plastic articles which method provides for control of the transfer of material to the mold in response to a readily-usable pressure factor or variation, (b) the provision of such a method adapted to be carried out automatically by simple apparatus, and (c) the provision of such a method which allows for, and if desired includes provisions for, a combined injection-compression molding procedure.

The preferred embodiment of the method aspects of the invention includes the step of closing off the normally existent passageway between the material feed means and the mold cavity in response to pressure change within such passageway, and more particularly in response to back pressure on material flowing through the passageway caused by material in the mold cavity filling the mold cavity. Accordingly, still further and more specific objects of the apparatus phase of the invention are: (a) the provision of a simple pressure regulating means adapted to be disposed between, and used in combination with a so-called "pressure pot" and a mold, which pressure regulating means is automatically operable to shut off the passageway through which material is delivered from the pressure pot to the mold in response to back pressure of material in the passageway caused by material in the mold cavity filling such cavity; (b) the provision of such an apparatus which is simple in construction and incorporates but a few parts whereby it can be inexpensively manufactured, and whereby it is trouble-free in operation; (c) the provision of such an apparatus which includes means for adjustably limiting the pressures to that required for operation thereof whereby the final pressure on material in the mold caused by material fed thereto can be readily reduced to a predetermined value; (d) the provision of such an apparatus which includes means for controlling the rapidity with which the passageway is blocked so that the material entering the mold cavity can be controlled; and (e) the provision of such an apparatus which is readily adapted for use on existing injection molding machines.

From the above it will be observed that the method of the invention includes the steps of forcing flowable material under pressure through a passageway communicating with a mold cavity, and then closing the passageway when the mold cavity is at least substantially filled with molding material whereby the pressure directly applied to the molding material in the cavity, when filled or after the passageway is closed, is independent of any increased pressure thereafter applied to the material in the passageway closed off from the cavity. In accordance with the preferred embodiments of the method provided by the invention, the passageway is positively closed off in response to back pressure on material flowing through the passageway caused by material in the mold filling the mold.

Certain modifications of the preferred embodiment of the method of the invention provide (a) for performing the steps of closing off the passageway with controlled rapidity, and (b) for closing off the passageway momentarily until material in the mold cavity has at least partially solidified and retracted and thereafter opening the passageway momentarily to admit additional material, and then positively again closing the passageway.

In addition to the foregoing, the method of the invention also provides for molding articles which must be critically precise by performing the steps of injecting material in condition to be molded into a mold cavity under an injection pressure, and thereafter compressing the material in the cavity without directly applying the injection pressure thereto. The compression method of molding articles is carried out in accordance with the invention by introducing the plastic material into the mold cavities through a passageway in one of the mold sections under a pressure at last equal to the pressure urging the mold sections together so as to fill the cavity, then positively partially closing the passageway in response to back pressure on material flowing through the passageway caused by the material in the mold cavity filling the cavity, then momentarily applying additional pressure to the plastic material in the mold cavity at the end of the mold filling operation to separate the mold sections without allowing any substantial leakage of molding material from between the sections, then completely and positively closing the passageway in response to the back pressure so that the pressure directly applied to the molding material in the cavity after closing is independent of any change in pressure thereafter applied to the material in the passageway closed off from the cavity, and thereafter applying additional pressure to the mold sections until the component being formed in the mold cavity thereof has solidified or set.

The apparatus embodiments of the invention provide means for automatically carrying out the method steps of the invention, which means are responsive to pressure of the material in the mold cavity for automatically predetermining the highest pressures directly applied to material in the cavity. Preferably such means include a valve member disposed in the passageway leading to the mold cavity through which material is fed thereto, and means biasing the valve member to open the passageway, only when the internal pressure in the cavity is below a predetermined value. Certain preferred embodiments of the apparatus phase of the invention incorporate means for preselecting the internal cavity pressure at which the material is fed into said cavity, and for controlling, adjustably said feeding and, the rapidity with which the passageway is closed. These preferred embodiments, as well as other apparatus embodiments of the invention, preferably incorporate means for adjusting the means for closing off the passageway whereby the latter-mentioned means is adapted to serve as a closure for the material feed means of a molding machine when such machine is not in use.

The various embodiments of the invention will be better understood and objects other than those specifically set forth above may become apparent, when consideration is given to the following detailed description of the invention. The description refers to the annexed drawings, wherein FIGURE 1 is a side view, partially in section, showing a double action injection molding press suitable for carrying out the method embodiments of the invention, and having installed thereon one form of the apparatus provided by the invention for automatically performing such method steps;

FIGURE 2 is a side view, partially in section, of a single action injection press suitable for carrying out the method steps of the invention, and having installed thereon another form of apparatus provided by the invention for automatically carrying out such steps;

FIGURE 3 is a fragmentary vertical cross-sectional view of an apparatus provided by the invention which is installed on the machine shown in FIGURE 1;

FIGURE 4 is a similar vertical cross-sectional view of the apparatus shown in FIGURE 3 after the mold cavity has been filled wtih material;

FIGURE 5 is a fragmental detailed plan view taken on the line 5—5 of FIGURE 3 and showing the preferred construction used for passing material between the feed means of the apparatus and the automatic pressure regulating means provided by the invention for closing off communication between the feed means and the mold cavity;

FIGURE 6 is an enlarged fragmental detailed view of the pressure regulating or material feed control means shown as installed on the machine of FIGURE 2;

FIGURE 7 is a fragmentary vertical cross-sectional view of an apparatus provided by the invention which is installed on the machine shown in FIGURE 1, but which, in addition, incorporates means for controlling the rapidity with which communications between the feed means of the injection apparatus and the mold cavity is shut off; and FIGURE 8 is a view similar to FIGURE 7 after the mold cavity has been filled with material and is about to become or is being subjected to additional compression.

For purposes of convenience, the invention is shown in the drawings and discussed hereinafter as used in connection with, and as applied to, injection presses operated by hydraulic pressure. However, it is to be understood that the invention can be used with compressed air or mechanical presses, presses wherein the injection or transfer pressure is obtained by extrusion or by a screw system, or presses wherein any other suitable means are provided for injecting material in condition to be molded with a mold cavity. It must be remembered, though, that injection presses present different problems because of their rapid speed of operation, and that the invention while usable with other types of machines is most significant as used on injection presses.

(A) *The method*

In FIGURE 1, the double action injection molding press shown is designated by the numeral 100. This press includes a conventional lower hydraulic power unit 102 comprising a cylinder 110 having fluid conduits 112 and 114 communicating therewith, and having a piston 113, with a sealing ring 115 thereon, slidable within the cylinder. As is conventional, a piston rod 116 projects through the upper end 118 of the cylinder, and a mold support plate 120 is fixed to the piston rod 116.

As is also conventional, the double action press has an injection power unit 104 comprising a cylinder 130 having fluid conduits 132 and 134 communicating therewith, and having a piston 136, carrying a sealing ring 137, which is displaceable within the cylinder 130. Extending from the piston 136 is a piston rod 138 passing through the lower end 131 of the cylinder 130 and carrying an injection plunger 139. Guide rails 106 and 108 are provided to maintain the piston rod 138 in alignment with the piston rod 116 so as to cause application of opposed pressures along a common axis.

The lower mold support late 120 is reciprocally mounted on the guide rails 106 and 108. Carried in fixed relation on the guide rails are an upper mold section support plate 1 and a support plate 7 for an injection pressure cylinder 5. In place of the conventional discharge end outlet, a pressure regulator 10 is disposed at the lower end of the injection cylinder. This pressure regulator, however, like a normal outlet, provides a fluid path between the injection chamber in the interior of the injection cylinder 5, and a channel 3 leading into a mold cavity 14 defined by recesses in the cooperating faces of mold sections 2 and 6. The pressure regulator 10 has an additional function, as explained below, in that it allows for automatic performance of the method steps provided by the invention. Before considering this additional function, however, attention is directed to operation of the press.

The parts of the double action injection press of FIGURE 1 are shown in the position which they occupy after the mold sections have been brought together, but before material is injected into the mold. Of course, as is well known to those of ordinary skill in the art, the piston 113 initially is lowered by virtue of fluid being fed under pressure through the conduit 112 whereby the lower mold section support plate 120 assumes the lower dot and dash line position shown in FIGURE 1, as does the lower mold section 6 carried thereby. Thereafter fluid is fed in through conduit 14 and the parts assume the position shown in full lines. Material which has been fluidized within the pressure pot or injection cylinder 5 by a suitable heating means (not shown), is then, under descending action of the injection plunger 139, forced from the injection pressure cylinder 5 through the pressure regulator 10 into the mold cavity 14. In the embodiment shown, for the reasons explained in detail hereinafter, such material is passed through the channels and chambers of the pressure regulator 10.

Assuming the pressure regulator 10 constitutes no more than a passageway such as exists between the outlet of a conventional pressure cylinder 5 and the inlet to a conventional mold section 2 through the passageway 3, then forces would act on the mold sections, and within the mold cavity as follows: The pressure exerted by fluid introduced through the conduit 114 would press upwardly on the piston 113 causing the lower mold support plate 120 to assume the position shown in full lines, whereby it presses the lower mold section 6 into contact with the upper mold section 2. Once the mold sections 2 and 6 are pressed into contact, then additional force would be applied to the mold section by virtue of the descending of the plunger 139 and the forcing thereby of material into the mold cavity. Initially, since the cavity is empty, the material flows therein without exerting much downward pressure against the frontal surface S of the mold cavity. However, when the mold fills up, then the full pressure applied by the piston 138 is transmitted through the material in the injection cylinder 5 and the passageway connecting the injection cylinder 5 with the mold cavity 14 whereby such pressure is exerted on the full area of frontal surface S of the mold cavity 14. This downward force, acting against the force exerted by the piston 113 pushing upwardly on the mold sections, results from the application of the pressure applied by the injection plunger 139 as exerted over the frontal surface area of the mold cavity. That is to say, the downward force is equal to the pressure exerted by the injection plunger 139 on the material in the feed means, multiplied by the area of the horizontal faces of the mold cavity 14 (force=pressure×area). In order to prevent the mold parts 2 and 6 from separating, it is imperative that the force acting downwardly and tending to separate the sections 2 and 6 be less than the force acting upwardly tending to push the sections 2 and 6 together. At the same time, for rapid production of articles and proper injection, the pressure applied by the injection plunger 139 must be quite large so as to quickly pass material in the feed means, pressure pot, or injection cylinder 5 through the passageway into the mold cavity 14.

There is a predetermined minimum force which can be exerted on the material in the cavity before said cavity is filled for proper molding, and later for proper given force pressing the mold parts together, there is a predetermined maximum pressing forces for large frontal surface area moldings. This relationship has heretofore caused problems in molding articles with large frontal surface areas because it is not convenient to obtain large forces pushing the mold sections together.

In addition to the limitations caused by the forces acting on the mold, it should be understood that as the injection piston 138 descends in a conventional machine, it initially encounters little resistance in forcing material into the mold cavity 14 through the passageway leading from the injection cylinder 5. However, as the mold fills, the injection plunger 139 continues to descend and substantial resistance is encountered. The filling of the mold causes the injection plunger to exert variable and unduly high pressures on material within the mold cavity by virtue of the direct application thereon of pressures applied to material in the injection cylinder 5. As a result, severe internal stresses are often set up in molded pieces, and when the molded pieces are of substantial size, these stresses tend to destroy the uniformity of the product and cause defective molded pieces.

To overcome the problems set forth above, and to provide quality moldings of articles having large frontal surfaces conveniently, the invention provides a method of controlling the feeding of material from the injection cylinder 5 to the mold cavity 14. The flowable molding material is forced under pressure through a passageway from the injection cylinder 5 to the mold cavity 14, just as such material would be forced through a passageway in accordance with conventional practice as explained above. However, after the material has been forced through the passageway and before the mold is substantially filled, then the invention provides for reducing the feeding pressure to a predetermined value until the cavity is filled and the passageway is closed. By closing the passageway during the last stages of filling, any pressure which is thereafter exerted by the injection plunger 139 on material in the injection cylinder 5, or on material in the portion of the passageway closed off from the mold cavity, will not be, in this instance, transmitted directly to the material in the mold cavity.

After restricting the feeding before the cavity is full, there is no increase in the force applied to material in the cavity by the material fed thereto and the internal stresses set up by prior machines are eliminated. Moreover, by virtue of the fact that the passageway is closed off, before the cavity is substantially filled, the pressures exerted by the injection plunger 139 are not transmitted, after closing, to the frontal surface of the mold cavity 14, and thus after the passageway has been closed off such pressures do not act to force apart the mold sections in opposition to the force maintaining the sections pressed together. Accordingly, the frontal surface of the mold cavity can be increased and/or the injection pressure of the injection plunger 139 can be increased without serious concern for the force maintaining the mold parts together.

While the step of progressively closing off the passageway before the mold cavity is substantially filled constitutes one of the basic aspects of the method embodiment of the present invention, such operation is effected in response to the back pressure on the material flowing through the passageway. This back pressure, as noted above, is caused by the material filling the cavity and thereafter resisting further flow of material into the cavity.

Moreover, while the basic aspects of the method embodiment of the invention provide slower controlled speed for closing off the passageway during the last stages of filling, certain preferred aspects of the method of the invention provide for closing such passageway with controlled rapidity whereby a slight extra amount of molding material is introduced into the cavity, thereby slightly separating the mold sections without allowing the molding material to escape from between the sections. When the passageway is closed with controlled rapidity, the additional material goes slightly out of the mold cavity and between the mold sections, thereby forcing the same slightly apart, but is maintained between the sections. After the slight extra material has entered the cavity and caused slight separation of the mold sections, then the passageway is shut off, and if desired thereafter the material in the mold cavity is further compressed.

Still another embodiment of the method aspect of the invention provides for closing the passageway to the mold cavity when the mold is substantially full in response to back pressure, and thereafter, once the material in the mold has set or solidified and as a result partially contracted, a slight extra amount of material may be introduced into the passageway by opening the same again whereby the material in the cavity is, through the introduction of the additional material momentarily through the passageway, again compressed fully.

With this latter-mentioned technique, the method of the invention provides the steps of injecting material in condition to be molded into the mold cavity under an injection pressure, and thereafter compressing the material in the cavity without directly applying injection pressure to the material in the cavity. Obviously, once the passageway is closed in accordance with the method of the invention, the injection pressure is not directly applied to the material in the cavity.

Notwithstanding the fact that the method discussed hereinabove is applicable to double action injection presses and can be used to advantage therein to increase the frontal size of articles which can be molded, the method finds even more effective application when applied to a single action injection molding press such as that shown in FIGURE 2. The single action injection molding press in FIGURE 2 differs from the double action press of FIGURE 1 by eliminating the upper or injection power assembly 104 and by allowing the lower hydraulic power assembly 102' to provide all forces of operation. Instead of fixing the upper mold section support plate 1' to the guide rails 108' and 106', such plate is made reciprocable thereon and the guide rails are provided with shoulders 230 and 232 which serve to limit downward movement of the upper mold support plate 1'. Moreover, the injection cylinder support 7' is made reciprocable on the guide rails 106' and 108', and the upper power assembly 104 is replaced by a stationary piston or plunger 160 supported at the top of the guide rails by a plate 162. Other components of the press in FIGURE 2 are substantially the same as the components of the press of FIGURE 1 and are designated by corresponding primed numerals.

In operation, the single action press of FIGURE 2 begins with the mold sections separated and the piston 113' in the lower dotted line position shown in FIGURE 2. Thereafter, when fluid is introduced under pressure through the conduit 114', the piston 113' rises causing the piston rod 116' to raise the lower mold section support plate 120' to a position where the lower mold section 6' engages the upper mold section 2'. After this operation takes place, the piston rod 116' continues to move upwardly carrying therewith the support plate 120' and the mold sections 6' and 2' and as a result raising the mold support plate 1' and the injection cylinder 5' and support 7' therefor. With continued upward movement of the piston 113' the injection cylinder 5' rises to a position where the piston 160 enters the cylinder forcing material therein through the passageway connecting the cylinder with the mold cavity 14'. With this type of press the single power unit 102' presses the mold sections together and also causes injection pressure to be applied to material in the injection cylinder 5'. Accordingly, there is no means for increasing the pressures tending to hold the mold sections together without increasing the injection pressure applied, and as a result, the limit of the frontal surface of the mold sections is greatly narrowed. In theory, the frontal surface of the mold sections can be no larger than the effective pressure surface of the injection piston or plunger 160, but in practice it has been found that the area can be slightly increased, although not to any substantial extent. Thus, the single action press is severely limited with respect to the size of the components, or the frontal surface which components molded therein can have. When the invention is applied to a single action injection press such as shown in FIGURE 2, however, the problems heretofore existing are not encountered. As the mold cavity fills, once a predetermined pressure is reached therein, the passageway between the injection cylinder 5 and the mold cavity 14 is closed and thus additional pressures applied to material in the injection cylinder 5 merely serve to press the mold parts more firmly together. Material in the injection cylinder passes controllably through the pressure regulator 10' as explained in more detail hereinbelow.

The single action injection press of FIGURE 2 can also be operated in such a way as to pass material into the cavity, then close the passageway thereto when the cavity is substantially filled, allowing a slight excess of material to flow into the cavity and separate the sections, and then, with continued upward movement of the piston 113' further compress the mold sections. This compression can take place until the pieces in the mold cavity have completely solidified. This provides for a combined injection and compression molding in a single machine, at a rate corresponding to that achievable in injection molding machines. This combined injection and compression molding can be obtained in a "double action" machine, as well as in a less expensive "single action" machine, and moreover, the combined action provides precision components by rapid molding and thus at low cost.

While various means and/or systems can be used to carry out the method of the invention, and while in some instances it may be found that the method can be carried out by manual operation, the invention also provides apparatus for automatically carrying out the method steps of the invention. The pressure regulators 10 and 10' to which reference has been made hereinabove, constitute an improvement comprising means responsive to the pressure of material in the mold, for automatically predetermining the maximum or the minimum pressures directly applied to material in the mold, which improvement coacts in combination with a mold and means for an accurate feeding of material through the mold under pressure.

It is to be understood that the term "directly applied to material in the mold" as used in this specification and the appended claims refers to the pressure which is exerted directly on such material as by material being fed from the feed means of the particular apparatus. Pressures which are exerted on the mold sections pressing the same together once the passageway from the feed means has been closed for purposes of this description will be considered as being applied indirectly to the material in the mold.

The pressure regulator 10 shown in the embodiment of FIGURE 1, the pressure regulator 10' shown in the embodiment of FIGURE 2, and the pressure regulator presented in FIGURES 3 and 4 all serve as means for automatically closing the passageway between the mold cavity and the means for feeding the material under pressure to the mold cavity when the internal pressure in the mold cavity exceeds a predetermined value, whereby once the passageway is closed the pressure directly applied to molding material in the cavity is independent of any increased pressure thereafter applied to the material in the passageway closed off from the cavity. It is to be understood, however, as explained above, (1) that the passageway can be opened to allow additional pressure on an at least partially contracted and solidified component, and (2) that the increased pressure applied to material in the passageway closed off from the cavity, may be used to further compress the mold sections, but the same is not applied directly to the molding material, when the passageway has been closed, as explained in more detail hereinafter.

(B) *The apparatus*

The preferred embodiments of the apparatus provided by the invention for automatically carrying out the method steps incorporate in the means for automatically closing the passageway, a valve member disposed within the passageway, and means for biasing the valve member to open the passageway only when the internal pressure is below a predetermined value. In the FIGURE 1 embodiment, a valve member 200 is biased to open the passageway by biasing means 202. In FIGURE 2 embodiment, a valve member 200[1] is biased to open the passageway for biasing means 202[1] the preferred structure shown in FIGURES 7 and 8 includes in addition to a valve member 200 and means 202 for biasing the valve member to open the passageway a means 206 for controlling the rapidity with which the valve member moves to close the passageway. This means 206 is not presented in FIGURES 1 and 2 but could be included in presses shown in these figures.

Preferably, there is also included means for selectively and releasably fixing the valve member in a position closing the passageway between the feed means and the mold cavity whereby the valve member serves as a stop when the machine is out of use, to prevent dripping of material from the injection cylinder 5. The preferred construction of these means will become apparent from the more detailed discussion below.

Referring to FIGURE 3, the pressure regulator 10 comprises a housing 23 having an arcuate projection 41 extending from the bottom thereof, which arcuate projection is adapted to mate with a concave recess 42 in the top face of the mold section 2. The concave recess 42 serves as an inlet coupling to the mold through which the mold inlet passageway 3 extends. Projection 41 is, as shown, the lower portion of a seating 17 received in a recess in the lower portion of casing 23 and forming a part thereof.

The other end of the casing 23 is tapered at 43 and mates with the lower end of the injection cylinder 5 which is also internally flared at 44 to properly mate with the tapered surface 43. The housing 23 has a material passage between the ends thereof adapted to form part of the passageway between the mold cavity 14 and the interior of the injection cylinder 5. This passage between the ends of the housing 23 is formed by a plurality of channels 34 extending from the upper face of the housing 23, in communication with the interior of the injection cylinder 5 to a chamber 18 provided in the recess of casing 23 in which seating 17 is received. The chamber 18 communicates with a lower chamber 19 via a passageway 20, and the lower chamber 19 communicates with the inlet passage 3 to the mold via an outlet passage 4, which constitutes a so-called blast pipe. The passageways 34, as shown in FIGURE 5, are preferably equally spaced apart and are disposed in a circle concentric with the axis of the casing 23 and discharge material toward the outer periphery of the inclined lower wall 18' of the chamber 18. With this construction, material flows freely from the injection cylinder 5 into the chamber 18 and flows through the interconnecting passageway 20 into the lower, preferably semi-elliptical, chamber 19.

In addition to having the passageways described hereinabove, the casing 23 of the FIGURE 3 embodiment is provided with a bore 212 in which the piston-like stem 22 of the valve 200 is slidably mounted. Valve 200 comprises a valve head 21 normally positioned in the lower chamber 19, and a neck 24 interconnecting the piston-like stem 22 and the head 21. The neck has a cross section smaller than the interconnecting passageway 20 and normally extends through the passageway. The valve head 21 has a semi-elliptical periphery smaller than the space defined by semi-elliptical chamber 19, and a top face with a diameter corresponding to the diameter of the interconnecting passageway 20 whereby the valve head is snugly receivable in the passageway. The pressure face of the valve head 21 presented to the chamber 18 is the same as the pressure face of the piston-like stem 22 presented to the chamber 18. This is achieved by making the stem 22 have a diameter corresponding with the diameter of the upper face of the piston head 21 and by having the interconnecting neck similarly connected to both components.

The casing 23 in addition to being provided with channels, chambers, bores and passageways described hereinabove, is preferably also provided with a transverse recess 214 adapted to receive a lever 27 which forms part of the means for biasing the valve body 200 to the normal or open position. The valve body 200 has a head 25 projecting from the upper end of the stem 22 into the recess 214, and the lever 27 is pivotally mounted in the recess by means of a pin 28 and carries a coupling fork 26 engaging the head 25 of the valve body, whereby the lever 27 pivots about the pin 28 upon movement of the valve body 200. The lever 27 is normally maintained in the position shown in FIGURE 3 by the biasing means 202 which includes a tension spring 29 coupled between the end of the lever 27 projecting laterally of the casing and a support 31 affixed to the feed tube 5 and projecting laterally thereof. One end of the spring 29 is coupled directly to the lever 27, and the other end is connected to the end of an adjusting bolt 32. This bolt extends through the support 31, and is adjustably fixable thereon by means of nut 33 which cooperates with threads on the bolt 32 to raise or lower the same with respect to support 31, and thereby adjust the tension on spring 29. Since the bolt 32, spring 29 and lever 27 coact to bias the valve body 200 to normal position as explained above, it should be apparent that bolt 32 serves as a simple means for preselecting the pressure at which the means for automatically closing the passageway operates. A counterbalance or counterweight can be used in place of spring 29, if desired, for some applications.

The pressure regulator 10 or means for automatically closing the passageways which is shown in FIGURE 1 comprises exactly the same elements as shown in FIGURES 3 and 4, and the latter figures are presented merely as enlarged with the pressure regulator 10 shown in FIGURES 1, 3, and 4, material, in normal operation, is fed from the injection cylinder 5 through the channels 34 in the casing 23 to the chamber 18, and then through the interconnecting passageway 20, around the neck 24 of the valve body, into the chamber 19, and around the valve head 21 disposed therein, through the passageway 4, into the inlet passage 3 of the mold cavity 14. Material traverses this path without any complete obstruction and fills the mold cavity. Because of the reduced diameter of the outlet passage 4 of the chamber 19, there is a certain minimum back pressure exerted on the valve head 21 but the tensional force of the spring 29 acting through the rocker arm lever 27 maintains the valve body in the position shown in FIGURE 3. However, when the cavity 14 fills and the material cannot easily flow through the inlet passageway 3 of the mold or the outlet passageway 4 of the chamber 19, then the pressure in the lower chamber 19 begins to increase and as a result acts on the head 21. Simultaneous with this increase in pressure, the pressure in the chamber 18 also begins to increase, and this increased pressure acts on the lower face of the piston-like stem 22 in such chamber causing the valve to rise. As a result, the valve head 21 rises to the position shown in FIGURE 4 and the passageway is closed off. Once the valve head 21 assumes this position, the lower face of the piston 22 and the top face of the head 21 present equal pressure surfaces to material in the chamber 18 and, regardless of the pressure of material in that chamber, the valve body does not move.

Since the valve body 200 and thereby the head 21 and piston-like stem 22 thereof are maintained in their normal position under the tensional action of the spring 29, as explained, increasing or decreasing the tension of such spring results in changing the pressure at which the valve moves to the closed position shown in FIGURE 4, and thus the "closing pressure" can be regulated. In other words, if the spring is preadjusted by means of the bolt 32, then the pressure at which the passageway will be closed in response to material filling the cavity is preselected movement of the valve 200 is purely pressure responsive and does not, like a conventional check valve, require reverse flow for actuation.

The embodiment of FIGURES 7 and 8 while identical to the embodiment of FIGURES 1, 3 and 4 in the aspects explained in detail above includes in addition, means for controlling the rapidity with which the passageway closes, and means for releasably fixing the valve head or valve body in a position blocking the passageway when the machine is not in use. If reference is made to FIGURE 7, it will be seen that the lever 27 is provided with a bore or aperture 61 therein through which a headed bolt 40 passes. This bolt is secured within a threaded recess 63 in the lower mold support plate 1, and can be adjustably threaded into the plate 1 so as to limit the upward movement of the outer end of the lever 27 whereby the valve head 21 can only move a certain distance downwardly in the chamber 19. If the bolt 40 is moved downwardly sufficiently in the support 1, the outer end of the lever 27 is lowered by the head of the bolt, thereby raising the head 21 of the valve member into closing engagement with the interconnecting passageway 20. In this position (FIGURE 8), and with the bolt 40 "tightened down," the valve head 21 serves as a plug for the injection cylinder 5 and prevents dripping of material therefrom.

While under certain circumstances, it may be desirable to merely shut off the passageway 20 once the pressure in the mold has reached a predetermined value, it is desirable in molding precision components, to provide for compression molding, in addition to injection molding. To achieve this result automatically, the apparatus embodiment of the invention provides for securing to the support 31 extending laterally of the injection cylinder 5, the means 206 for controlling the rapidity with which the valve body 200 is moved.

This means 206 constitutes a dashpot comprising a housing 300 having a projecting, connecting shank 302 extending through the support plate 31 and secured thereto by means of a nut 304 threadedly engaged on the projections 302. The housing 300 provides a cylinder in which a piston 307 is reciprocal to provide variable size chambers 36 and 37 on opposite sides of the piston. Extending from the piston 307 through the lower wall of housing 300 is the piston rod 35 which carries at its lower end a coupling screw 306. The coupling screw 306 has a shaft portion passing through another aperture in the lever 27 and threaded into, or otherwise suitably attached to the piston rod 35. Within the housing 300, there is provided a passage 39 connecting opposite ends of the cylinder in which the piston 307 reciprocates. Fluid can flow through the passage 39 between the portion 36 of the cylinder below the piston 307 and the portion 37 above the piston 307 at a rate controlled by an adjusting screw 38 which projects into the passage 39 to adjustably vary the cross section thereof. The movement of the piston 307 is controlled by the rate at which the fluid can pass through the passage 39. Since the lever 27 can only pivot with movement of the piston 307, and since the valve body 200 can only move with the lever 27, the valve head 21 moves upward with the controlled lever 27 so as to close the interconnecting passageway 20 with controlled rapidity in response to back pressure from material in the cavity 14. More particularly, upon the existence of back pressure from material in the mold, the head 21 of the valve begins to close or move partially upward, and is controlled in its further closing operation by the speed at which the piston 307 moves downwardly in the housing 300. Thus, the rate at which the passageway between the feed means 5 and the mold cavity 14 is blocked can be adjusted by adjusting the screw 38 in the dashpot 206, to control the rate of flow of fluid in passage 39.

The pressure at which the valve operates and the rate of closure can be so set that sufficient material is introduced into the mold cavity to cause a slight spreading apart of the mold sections.

More specifically, when material is flowing from injection pot 5 to the mold cavity 14, and as the mold cavity 14 approaches complete filling, pressure is exerted on the head 21 as well as on the body of the piston-like stem 22. This causes a rising of the valve and its head 21, but by virtue of the inclusion of the dashpot means 206, the rate at which the valve head moves upwardly is controlled so that a small amount of additional material enters the outlet passage 4 from the chamber 19 and the inlet passage 3 of the mold cavity before the passageway is completely closed. This additional material causes the slight spreading apart of the mold sections 2 and 6 as shown in FIGURE 8. The spreading should not be sufficient to allow any material introduced to escape from between the mold sections. This extra amount that causes the slight spreading is easily controlled by adjustment of the screw 38, because adjustment of such screw controls the rate at which the valve body is allowed to move, and thereby determines the time of the controlled closing, and as a result the amount of material allowed to flow into the chamber 19 after a sufficient pressure exists therein to cause the start of closing of the passageway.

After the additional material has been introduced in the chamber 19, and the passageway is closed by the valve the material in the mold cavity can be compressed by forcing the mold sections together. For example, in the single acting press of FIGURE 2 the lower piston 113' continues its upward movement to force the mold sections 2 and 6 together and maintain the same under pressure until the material in the mold cavity has solidified or set. Similarly, an additional compression can be exercised in the apparatus of FIGURE 1 by the introduction into the conduit 114 of fluid under a slight additional pressure which will cause compression molding.

A further operating procedure includes the step of introducing additional material into the mold cavity, once the material therein has contracted. By referring to FIGURE 3 again, it will be noted that once the material in the cavity 14 has solidified, and thereby contracted, there is a decrease in the pressure in the channel 3, outlet channel 4, and chamber 19. As a result, the valve body tends to move downwardly, opening the interconnecting passageway 20 and allowing a slight amount of additional material to enter the chamber 19, thereby causing the material in such chamber and in the outlet passage 4 and feed tube 3 to exert additional pressure on the material in the mold cavity 14. As soon as the additional material introduced into the chamber 19 fills the same it exerts the proper force to cause, then the valve body 200 to move upwardly again. The piston 307 of the dashpot does not move a sufficient distance for this operation to cause any real control.

While the preferred manner of introducing the additional material into the mold cavity for separating the sections thereof whereby the material in the mold can be thereafter compressed, contemplates the utilization of a dashpot means, it should be understood that basically the same effect can be achieved by adjusting the tension on the spring 29 so that the valve head 21 does not move upwardly until there is a sufficient increase in the pressure to cause a slight separation of the mold sections. Achieving the slight separation without the utilization of the dashpot means may be difficult, and thus the utilization of such means is preferred. It is important that the separation does not allow for leakage of material from between the mold sections, and accordingly precise control is desirable.

If reference is again made to FIGURE 2, it will be seen that a different form of pressure regulator than that described in detail above has been incorporated on the machine there shown. This regulator, which has been generally designated by the number 10' and is shown in some detail in FIGURE 6, comprises a casing 400 disposed between the injection pressure cylinder 5' and the mold sections 2' and 6'. The casing 400 has an inlet passageway 402. This preferably takes the form of a generally parabolic downwardly, extending inlet connection corresponding to the normal outlet of an injection cylinder. This inlet passageway 402 terminates in an offset passage 404 which communicates through an obliquely disposed bore 406 with an outlet passage 408 adapted to communicate with the inlet passage 3' of the upper mold section 2'. The bore 406 in the casing 400 extends at an acute angle to the axis extending between the ends of the casing. The section 410 of the bore to the left, as shown, has a smaller diameter than the section 412 to the right. Normally, material can pass through the inlet 402, the passageway 404, the bore 406, and the outlet passageway 408.

A valve member is slidably mounted in the bore 406 and has a first piston-like section 416 snugly receivable in the section 410 of the bore, and a second piston-like section 418 snugly receivable in the bore section 412. An interconnecting neck 420 extends between the valve sections 416 and 418 and is normally disposed at the intersection of the bore 406 with the passageway extending between the opposite ends of the casing 400. This neck permits the free flow of material between such ends. When a back pressure is exerted by material in the cavity filling the cavity, increased pressure is exerted on the left face of the valve section 418, and on the right face of the valve section 416 as shown, both of which faces are disposed within the bore 406, and communicate with the passage through which material flows between the ends of the casing 400. The piston-like valve section 418, having a larger diameter than the piston-like valve section 416 and being connected thereto by the neck 420 which eliminates an equal degree of the pressure face of each section, is caused to move to the right in response to this back pressure. In other words, by virtue of the fact that the section 418 offers a larger pressure face to the material flowing through the passageway than the pressure face of the section 416 there is an unbalanced force directed to the right. This causes a movement of the valve member to a position where the section 416 blocks communication between the offset passage 404 and the outlet passage 408, and as a result, the passageway between the injection cylinder 5 and mold cavity is blocked and the pressure exerted on material in the injection cylinder is not transmitted to material in the mold.

Of course, suitable means are provided for biasing the valve member 406 to the normal position shown in FIGURE 6. These means preferably take the form of a pivotally mounted arm 422 which engages a projecting member or head 424 extending outwardly of the casing 400 and cooperating with the cam face or flange 426 of the arm 422. The arm 422 is biased by means of a spring 427 (FIGURE 2) in a clockwise direction to normally maintain the parts in the position shown in FIGURE 6 against the pressures exerted on the piston sections 418 and 416 during the injection, but to allow the valve to be closed when predetermined back pressure is exceeded.

Though not shown in FIGURES 2 and 6, the apparatus may include means for adjusting the tension in the spring 427.

Moreover, if desired, a suitable dashpot can be coupled with the biasing arrangement shown in FIGURES 2 and 6 to provide for closing of the injection passage at a controlled rate. A screw 430 can serve to move the piston 416 into a position in which it blocks the injection passage when the machine is not in use.

After reading the foregoing detailed description of the invention, it should be apparent that the objects set forth at the outset of this specification have been successfully achieved. While certain preferred embodiments of the invention have been referred to in detail above, it is to be understood that various modifications can be made thereto without departing from the scope and spirit of the invention.

I claim:

1. In a method of molding plastic articles, the steps of injecting material in condition to be molded under an injection pressure into a mold having a cavity through a passageway thereto, closing said passageway with controlled movement to provide a slight excess of material in said mold, and then compressing the material in said mold.

2. A method of operating a molding machine having platens closeable under predetermined clamping pressure to clamp mold halves therebetween and means for injecting plasticized material under injection pressure into mold halves clamped between said platens, said method comprising: predetermining the force exerted by the material injected under injection pressure required to start separation of said mold halves and responsive to the attainment of said force positively blocking communication between said injecting means and said mold halves.

3. A method as set forth in claim 2 including the step of delaying the blocking of communication between said injecting means and said mold halves for a predetermined time sufficient to permit material injected during such time to cause a slight separation of said mold halves.

4. In an injection molding machine having an injection chamber, and an injection passageway communicating said chamber with a mold cavity, the combination comprising: a regulator member movable to close said passageway, and means normally biasing said member to a position opening said passageway, said member having multiple separate pressure faces presented to material in said passageway, whereby material in said passageway acts on at least one of said pressure faces to move said member to close said passageway in response to material filling said cavity, and thereafter acts on other of said pressure faces to maintain said member closing said passageway until the force of material applied to said member by material in said cavity decreases below the force applied to said member by said biasing means.

5. In a molding machine having platens closeable under clamping pressure to clamp mold halves therebetween and means for injecting plasticized material under injection pressure into mold halves clamped between said platens, the improvement comprising: a duct connecting said injecting means and said mold halves; a valve in said duct, said valve presenting greater area toward the mold halves than toward the injecting means; means applying a predetermined bias on said valve toward said mold halves and a coacting seat for said valve, said seat being in said duct and located toward said injecting means.

6. A method of molding a flowable material into a predetermined shape comprising the steps: of injecting said flowable material under pressure through a passageway controlled solely by a pressure-responsive means to a mold cavity, maintaining said passageway open by said pressure responsive means when the initial pressure in said mold cavity is less than said first-mentioned pressure, closing said passageway by the pressure in said mold cavity acting on said pressure-responsive means as said mold cavity fills with the flowable material and thereby isolating said cavity from said first-mentioned pressure, opening said passageway by the pressure-responsive means in response to a predetermined subsequent drop in pressure in the mold cavity as the flowable material therein slightly reduces in volume as it solidifies, and again closing the passageway by the pressure-responsive means in response to the increased pressure in said cavity caused by a further flow of material thereto which was caused by the reduction of pressure created by the solidifying of the flowable material in said cavity.

7. A pressure regulator for a molding apparatus having a mold and a pressure pot for the mold, comprising a casing adapted to be disposed between the pressure pot and the mold, said casing having a passageway extending between opposed ends thereof for passing material between the pressure pot and the mold, said casing also having a bore therein extending at an acute angle to the axis of said casing extending between said ends, said bore intersecting said passageway and having a greater diameter on one side of the intersection thereof with said passageway than on the other side of said intersection; a valve member slidably mounted in said bore, said valve member having a first section with a given diameter snugly receivable in said bore on said one side of said intersection, a second section snugly receivable in said bore on the other side of said intersection, said second section having a diameter larger than said given diameter and thereby a pressure face at the intersection in said bore larger than the pressure face of said first section, and a neck smaller than said bore at said intersection and normally disposed in said intersection to allow free passage of material through said passageway about said neck; and means resisting movement of said valve member when the pressure at said intersection is below a predetermined value and material is passing therethrough, said valve member being automatically movable to a position where said first section blocks said passageway when the pressure in said intersection exceeds a predetermined value under the action of the unbalanced force exerted thereon because of the larger effective pressure face of said section.

References Cited by the Examiner

UNITED STATES PATENTS

| | | | |
|---|---|---|---|
| 2,433,132 | 12/1947 | Lester | 18—30 |
| 2,487,426 | 11/1949 | Cousino | 18—30 |
| 2,582,260 | 1/1952 | Kutik | 18—30 |
| 2,668,986 | 2/1954 | Miler | 18—30 |
| 2,671,246 | 3/1954 | Lester | 18—30 |
| 2,671,247 | 3/1954 | Lester | 18—30 |
| 2,804,649 | 9/1957 | Hupfield | 18—30 |
| 2,938,232 | 5/1960 | Martin | 18—17 XR |

FOREIGN PATENTS 555,379  1/1957  Italy.

ROBERT F. WHITE, *Primary Examiner.*

WILLIAM STEPHENSON, MORRIS LIEBMAN, ALEXANDER H. BRODMERKEL, *Examiners.*

T. F. SHANAHAN, M. H. ROSEN, R. B. MOFFITT,
*Assistant Examiners.*